United States Patent [19]

Owada et al.

[11] Patent Number: 5,542,094
[45] Date of Patent: Jul. 30, 1996

[54] MOBILE COMMUNICATION SYSTEM MAKING USE OF ISDN SWITCHED NETWORK

[75] Inventors: Junichi Owada; Masahiko Yahagi, both of Tokyo, Japan

[73] Assignee: NEC Corporation, Tokyo, Japan

[21] Appl. No.: 516,126

[22] Filed: Aug. 17, 1995

Related U.S. Application Data

[63] Continuation of Ser. No. 262,311, Jun. 17, 1994, abandoned.

[30] Foreign Application Priority Data

Jun. 18, 1993 [JP] Japan ..................................... 5-147981

[51] Int. Cl.⁶ ..................................................... H04B 1/00
[52] U.S. Cl. ..................... 455/54.1; 455/33.1; 455/53.1; 455/54.2; 455/56.1; 379/59; 379/60; 370/95.1; 370/110.1
[58] Field of Search .................................. 455/54.1, 56.1, 455/33.1, 53.1, 54.2; 370/95.1, 110.1; 379/58, 59, 60, 61, 62, 63

[56] References Cited

U.S. PATENT DOCUMENTS

| 5,040,177 | 8/1991 | Martin et al. | 379/61 |
| 5,297,193 | 3/1994 | Bouix et al. | 379/63 |
| 5,303,285 | 4/1994 | Kerihuel et al. | 379/58 |
| 5,319,699 | 6/1994 | Kerihuel et al. | 379/58 |

FOREIGN PATENT DOCUMENTS

| 151136 | 9/1983 | Japan . |
| WO93/11625 | 6/1993 | WIPO . |

OTHER PUBLICATIONS

Alcatel Digital Network Services Ballard et al Cellular Mobile Radio as an Intelligent Network Application 1989 (pp. 393–397).

K. Hallman et al., "Integrating Advanced Technologies for a PCS Trial," Annual Review of Communications, National Engineering Consortium, vol. 46, pp. 1008–1012.

Kinoshita, "Technique Supporting Digital Mobile . . . Network Implementation Technique," *Journal of the Electronic Information Communication Society of Japan*, vol. 73, No. 8, 1990, pp. 812–818.

*Primary Examiner*—Reinhard J. Eisenzopf
*Assistant Examiner*—Lee Nguyen
*Attorney, Agent, or Firm*—Sughrue, Mion, Zinn, Macpeak & Seas

[57] ABSTRACT

Base stations are connected to subscriber lines of neighboring ISDN local switches, and mobile subscriber connection control equipment connected to the subscriber line of a particular ISDN local switch manages mobile subscriber data register equipment. Connection of a call which originates from or terminates at a mobile station, registration of the location of the mobile station, and channel switching process during service are performed by way of the mobile subscriber connection control equipment using an ISDN subscriber interface.

4 Claims, 7 Drawing Sheets

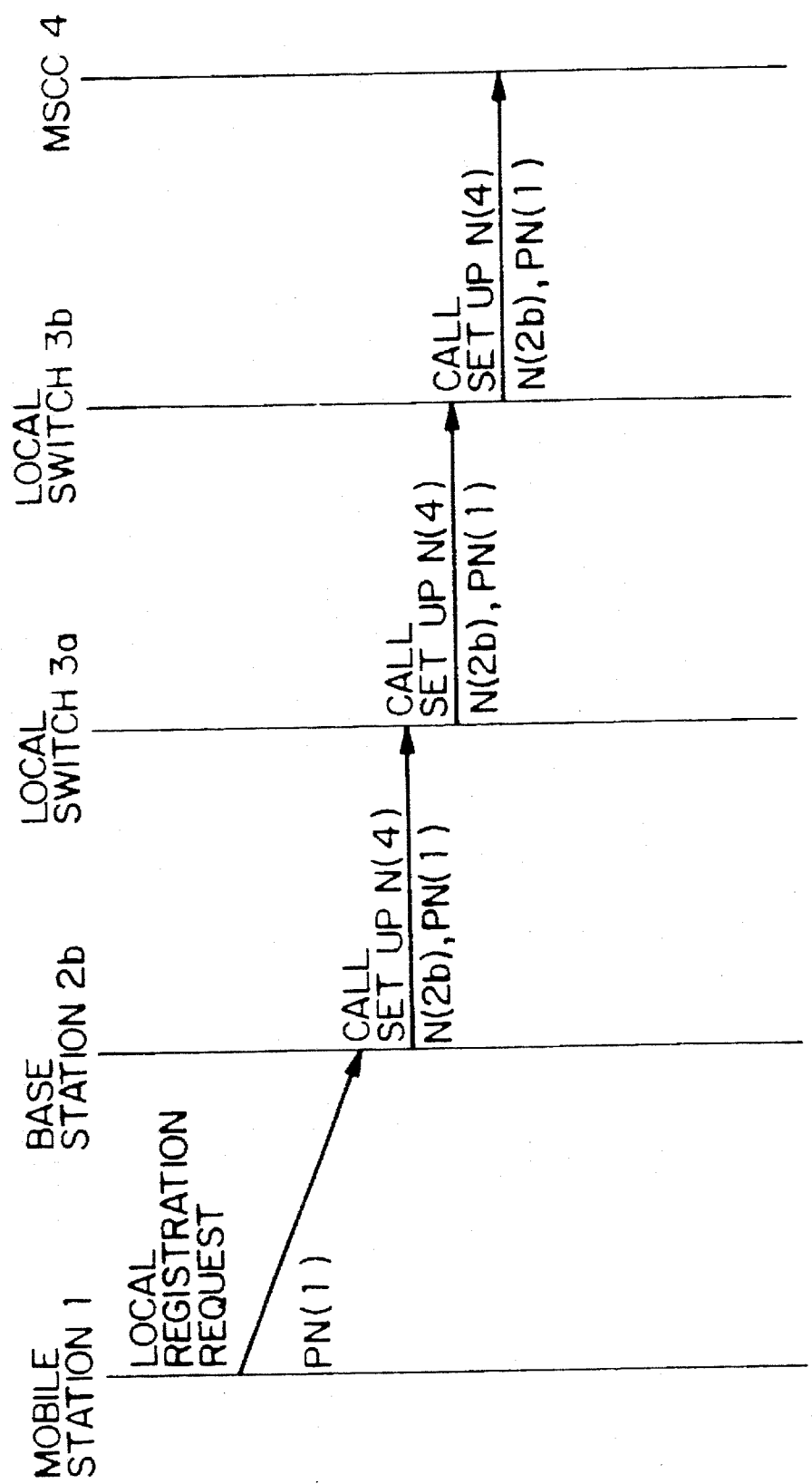

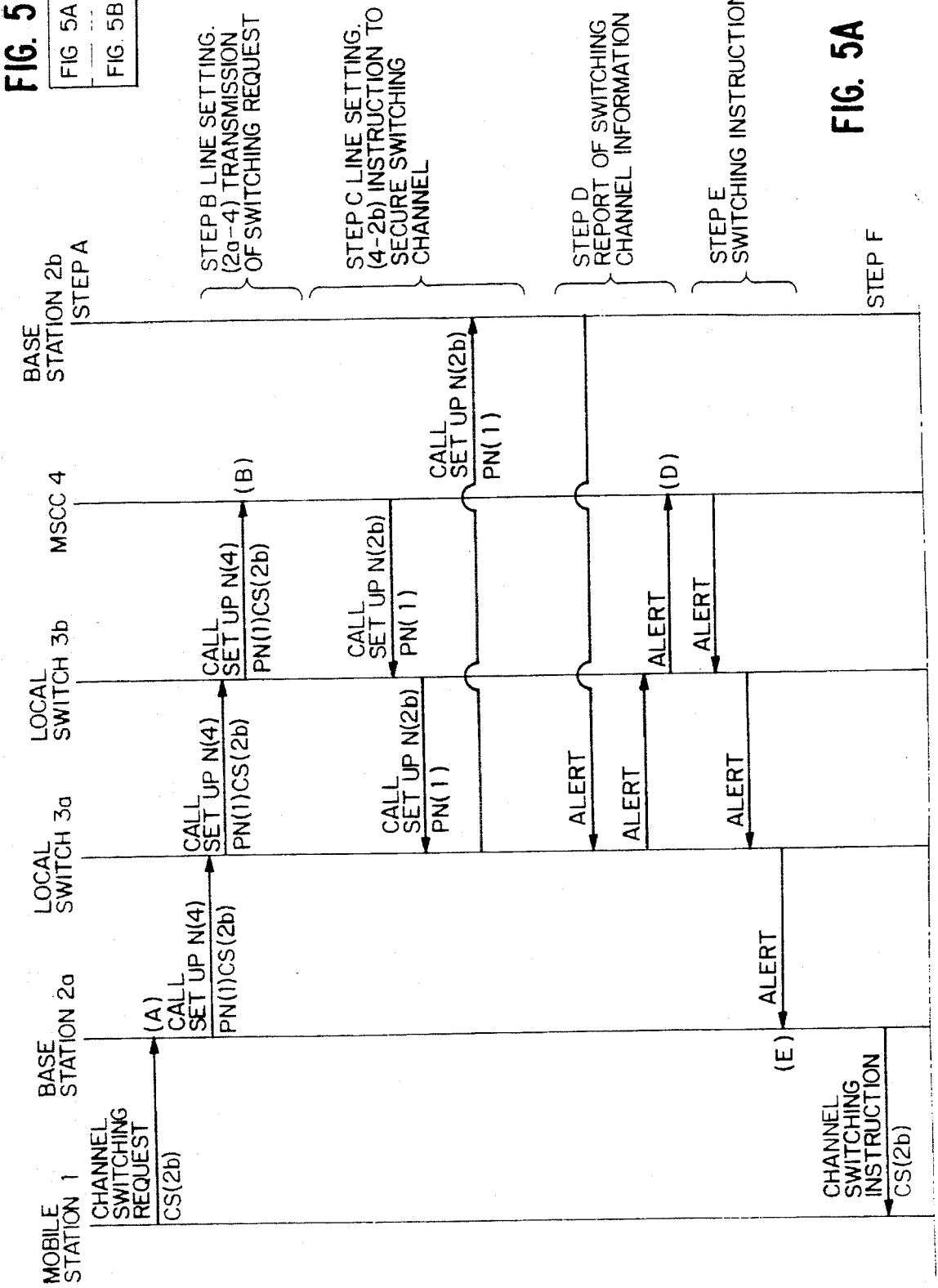

MOBILE COMMUNICATION SYSTEM MAKING USE OF ISDN SWITCHED NETWORK

This is a Continuation of Application Ser. No. 08/262,311 filed Jun. 17, 1994 now abandoned.

BACKGROUND OF THE INVENTION

1. Field of the Invention

This invention relates to a mobile communication system, and more particularly to a digital mobile communication system which makes use of an ISDN switched network.

2. Description of the Prior Art

Conventionally, a mobile communication system is constructed with a switch for exclusive use for mobile subscribers. For instance, in order to perform a connection process of a call which is originated or terminated between a mobile subscriber which uses a mobile station and another subscriber of a fixed network, a switch for exclusive use (visitor mobile telephone switch) is first provided for each of the base stations located in a prescribed area, and these switches are connected to the fixed network (routing switched network) by way of gateway mobile telephone switches (Document 1 and Document 2).

Document 1: Kota Kinoshita, "Technique Supporting Digital Mobile Telephones - System Network Implementation Technique," Journal of the Electronic Information Communication Society of Japan, Vol. 73, No. 8, pp. 812–818, 1990.

Document 2: Minoru Tanaka, "Mobile Radiocommunication System," Japanese Patent Laid-Open No. 151136/83.

FIG. 6 is a block diagram showing an example of a conventional mobile telephone system disclosed in Document 1. Referring to FIG. 6, mobile station 11 has radio transmission and reception functions. Base stations 12a and 12b are connected to visitor mobile telephone switch 13 and perform radio communication with mobile station 11, and further per-form call connection with visitor mobile telephone switch 13. Visitor mobile telephone switch 13 has visitor control and connection functions for mobile station 11. Gateway mobile telephone switch 14 has a routing function between visitor mobile telephone switch 13 and public telephone switched network 15 including local switch 16 to which fixed subscriber 17 is connected. Home memory station 18 is connected to visitor mobile telephone switch 13 and gateway mobile telephone switch 14, and registers the specific numbers of mobile stations and location registration information.

The system of Document 2 is proposed to allow a subscriber to perform communication by way of a same terminal between different mobile radiocommunication systems such as a mobile telephone system, a portable telephone system and a cordless telephone system. Claim 1 recites a mobile telephone radio base station and a portable telephone radio base station connected to a wire communication switched network. According to an embodiment, however, base stations of the mobile telephone system and the portable telephone system are connected to switches for exclusive use for mobile telephones, and all base stations are not connected to a local switch of an ISDN switched network.

SUMMARY OF THE INVENTION

It is an object of the present invention to provide a mobile communication system wherein all base stations are connected to neighboring local switches of an ISDN switched network, and connection of a call originated from or terminated at a mobile station, registration of the location of the mobile station and channel switching during service are controlled by mobile subscriber connection control equipment (MSCC) which is connected to a particular one or more of the local switches of the same ISDN switched network and which controls mobile subscriber data register equipment (MSDR), or in other words, a mobile communication system which is constructed in an ISDN switched network making use of an existing ISDN fixed switched network without providing a switch for exclusive use for mobile communication.

To achieve the above object, there is provided a mobile communication system which makes use of an ISDN switched network, comprising:

mobile subscriber data register equipment for registering information regarding mobile subscribers including subscriber numbers of the mobile subscribers, subscriber data of the mobile subscribers, identification numbers of mobile stations, and location information of the mobile stations;

a base station connected to a subscriber line of an ISDN local switch for performing radio link control of a mobile station to connect a call which is originated from or terminated at the mobile station to said ISDN switched network by way of the subscriber line; and mobile subscriber connection control equipment connected to a subscriber line of the ISDN local switch for managing the mobile subscriber data register equipment and controlling connection of a call which is originated from or terminated at a mobile station, registration of the location of a mobile station, and a channel switching process during service by way of the subscriber line.

BRIEF DESCRIPTION OF THE DRAWINGS

FIG. 4 is a signal sequence diagram of the mobile communication system of FIG. 1 when the registration of the location of the mobile station is updated;

DESCRIPTION OF THE PREFERRED EMBODIMENT

An embodiment of the present invention is described below with reference to the drawings.

Figure 1:
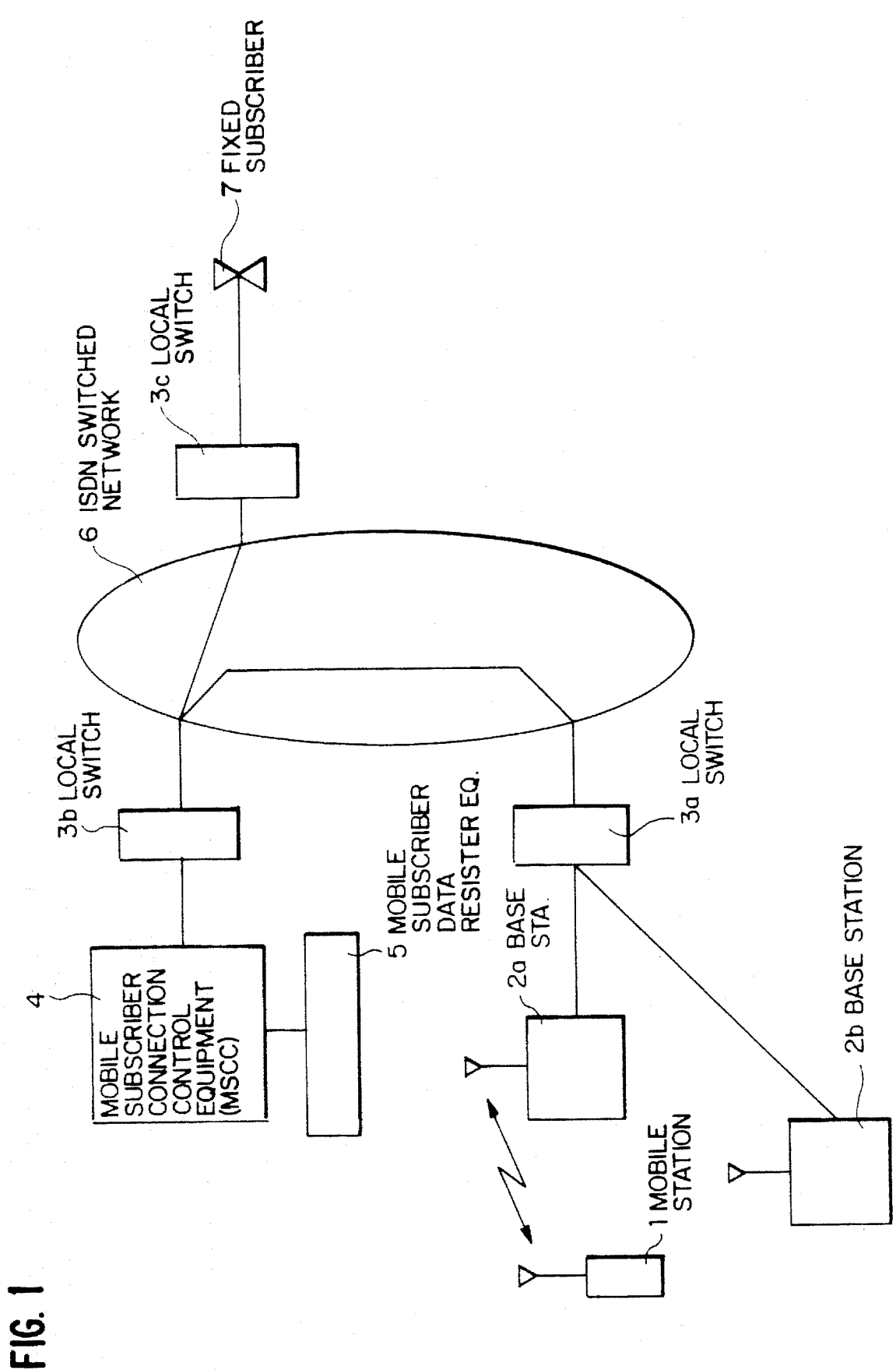
FIG. 1 is a block diagram showing an embodiment of a mobile communication system of the present invention.

Referring to FIG. 1, mobile station 1 is an equipment unit for a mobile subscriber having radio transmission and reception functions and is in use under required registration by a mobile subscriber. Base stations 2a and 2b perform radiocommunication with mobile station 1 and are connected to subscriber lines of neighboring ISDN local switch 3a so that they perform call connection with mobile subscriber connection control equipment (hereinafter referred to MSCC) 4 by way of ISDN switched network 6. Mobile subscriber data register equipment 5 is connected to MSCC 4 and registers various information regarding mobile subscribers including subscriber numbers of the mobile subscribers, subscriber data, and identification numbers and location information of mobile stations. Mobile MSCC 4 is connected to a subscriber line of ISDN local switch 3b and controls the mobile subscriber data register equipment 5 and controls connection of a call originated from or terminated at the mobile station 1. Fixed subscriber 7 is connected to local switch 3c, and the local switches 3a, 3b and 3c are connected to ISDN switched network 6, Operation of the mobile communication system of FIG. 1 is described below referring to FIGS. 2–5.

Figure 2:
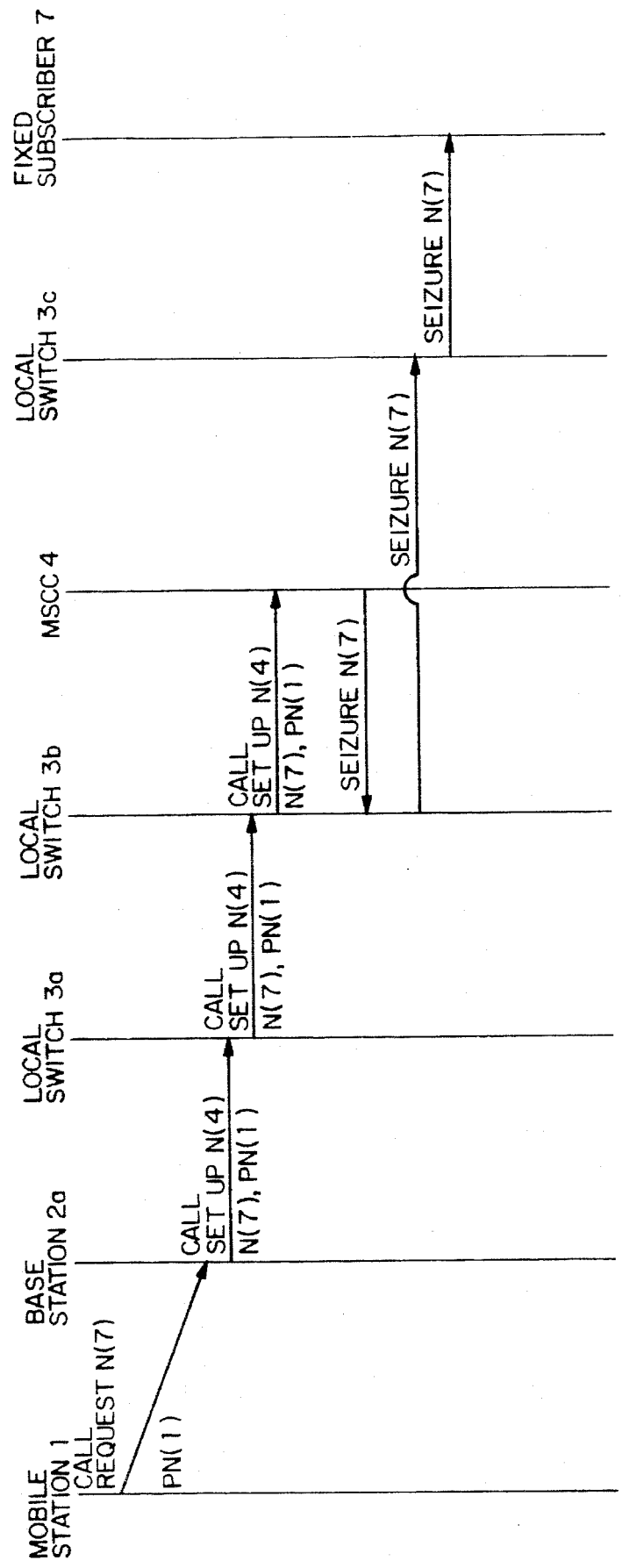
FIG. 2 is a signal sequence diagram of the mobile communication system of FIG. 1 when a call is originated from the mobile station.

When attempting to originate a call from mobile station 1 toward fixed subscriber 7, as shown in FIG. 2, mobile station 1 sends a call request to base station 2a, which controls mobile station 1, designating the called subscriber number N(7) and an identification number PN(1) of mobile station 1. Upon reception of the call request, base station 2a seizes local switch 3a and originates a call designating the subscriber number N(4) allocated to MSCC 4 as a terminating address and designating the designated called subscriber number N(7) as the terminating sub-address and the mobile station identification number PN(1) as the originating sub-address. MSCC 4 holds a communication line set by way of local switch 3a, ISDN switched network 6 and local switch 3b, and reads out subscriber data corresponding to the received mobile station identification number PN(1) from the mobile subscriber data register equipment 5. MSCC 4 then analyzes the thus read out subscriber data and, after it confirms that the service is available with the mobile subscriber, it originates a call to ISDN local switch 3c designating the called subscriber number N(7) as a called number.

Figure 3:
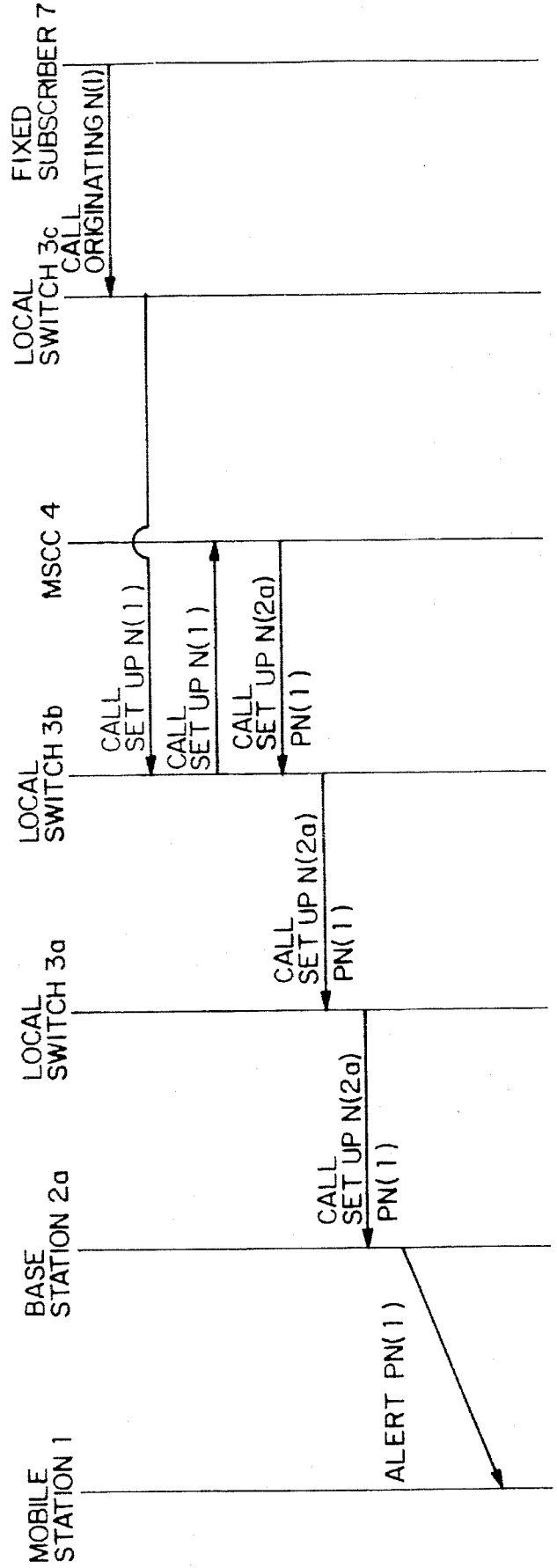
FIG. 3 is a signal sequence diagram of the mobile communication system of FIG. 1 when a call is terminated at the mobile station.

When a call is to be originated from the fixed subscriber and terminated at the mobile station as shown in FIG. 3, fixed subscriber 7 originates a call designating the subscriber number N(1) of the mobile subscriber as a destination number. ISDN switched network 6 seizes ISDN local switch 3b with the mobile subscriber number N(1), and ISDN local switch 3b seizes MSCC 4. Holding a communication line set by way of the local switch 3c, ISDN switched network 6 and local switch 3b, and using the mobile subscriber number N(1) which was designated upon seizure, MSCC 4 reads out and analyzes subscriber data of the mobile subscriber, the identification number PN(1) and location information of the mobile station 1 in use, determines at least one or more base stations 2a to be seized from the analyzed location information, and originates a call designating the mobile station identification number PN(1) as the destination sub-address and the subscriber number N(2a) allocated to base station 2a as the destination address. Base station 2a alerts mobile station 1 with the mobile station identification number PN(1) and terminates the call at mobile station 1.

Updating of location registration upon movement of a mobile station proceeds in the following manner as shown in FIG. 4. If it is assumed that base stations 2a and 2b belong to different location registration areas and mobile station 1 detects a changing of the location registration area when it moves from the location registration area of base station 2a into the location registration area of base station 2b, mobile station 1 transmits a location registration request signal to base station 2b. Base station 2b seizes local switch 3a and originates a location registration request signal designating the identification number PN(1) of mobile station 1 as an originating sub-address and the subscriber number N(4) allocated to MSCC 4 as a terminating address. MSCC 4 calculates location information based on the mobile station identification number PN(1) and the originating address N(2b) from base station 2b and effects updating of the location information in the mobile subscriber data register equipment 5.

Figure 5B:
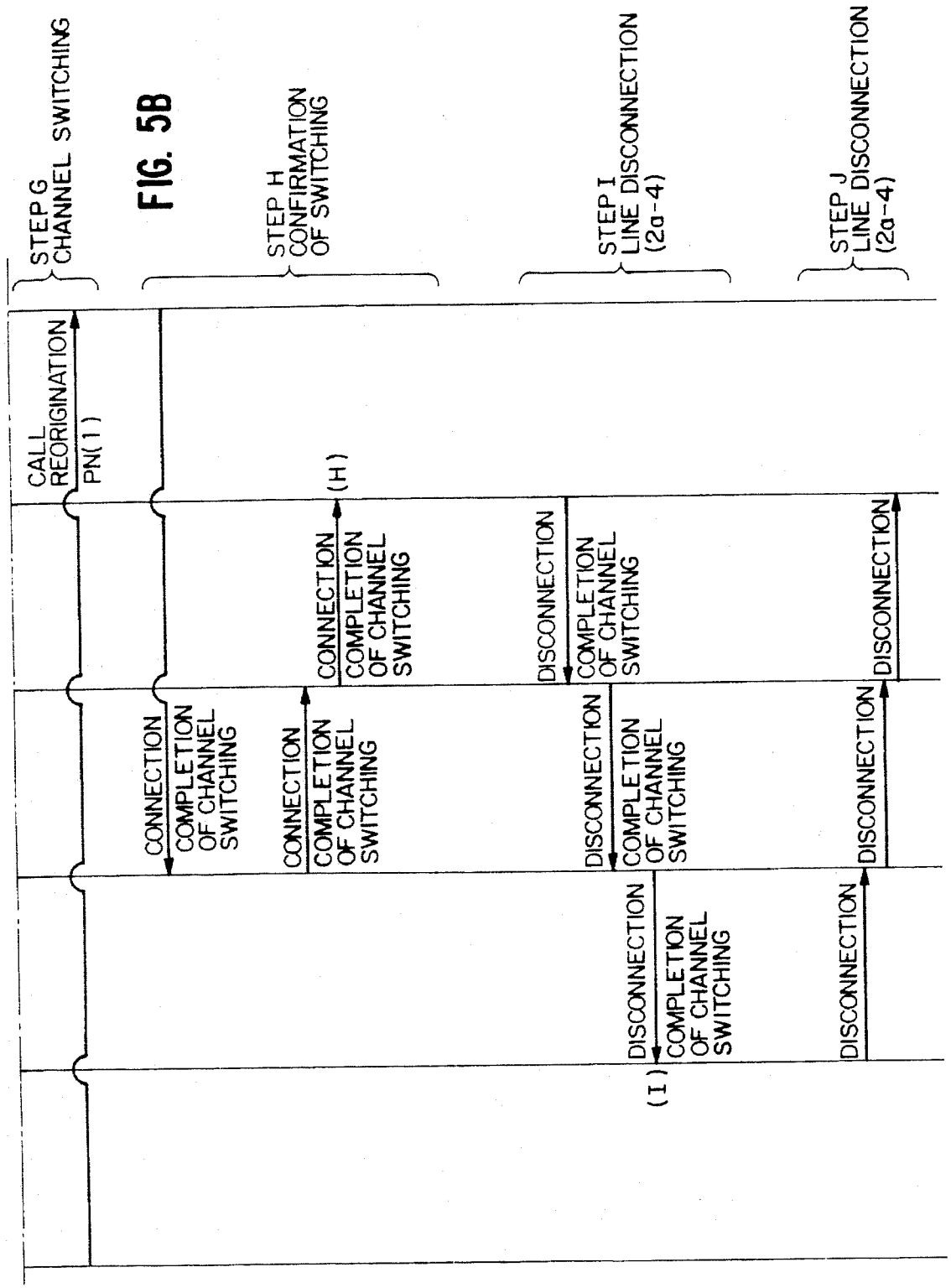
FIG. 5 is a signal sequence diagram of the mobile communication system of FIG. 1 when a radio channel is switched during communication.
Figure 6:
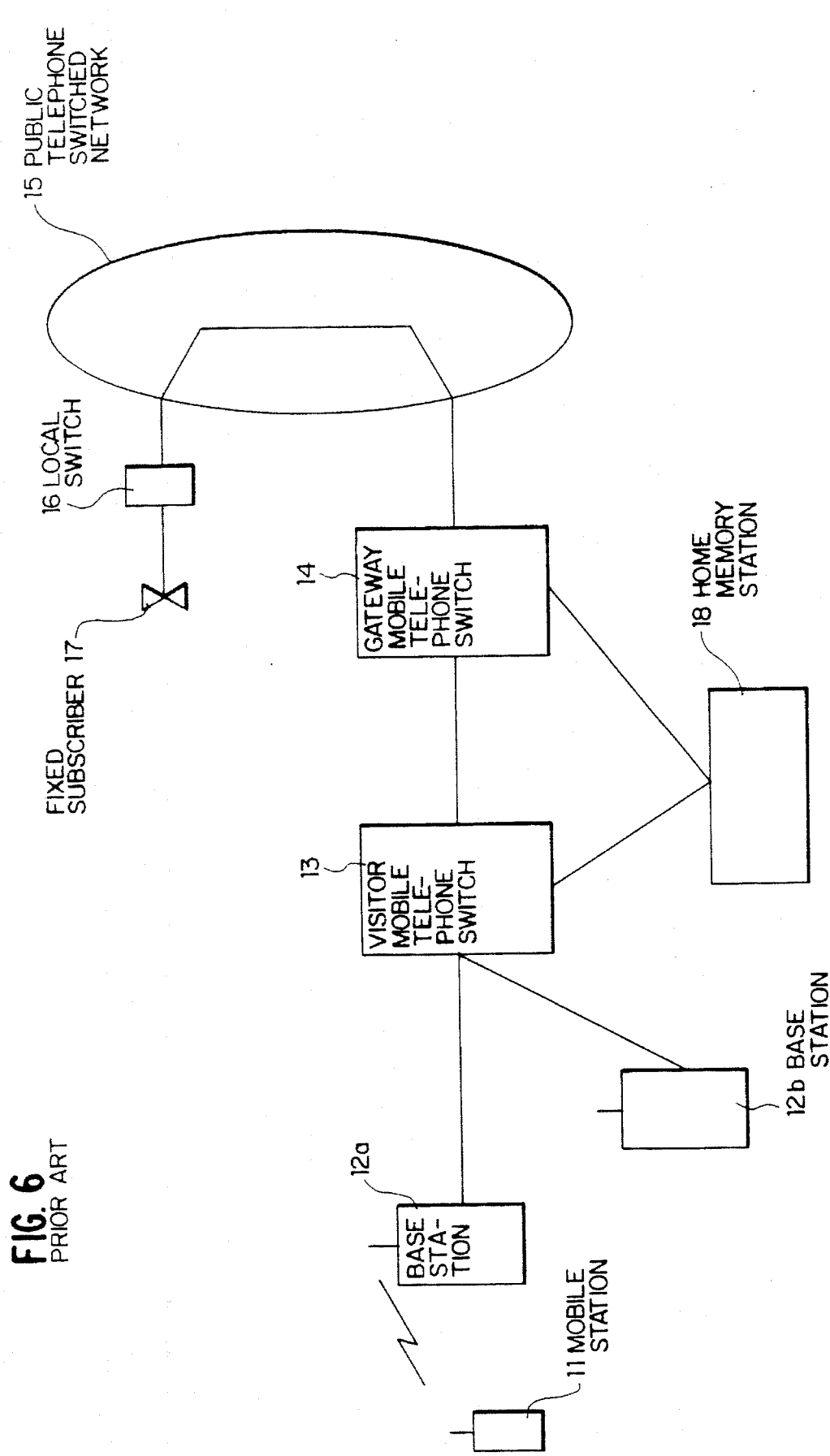
FIG. 6 is a block diagram showing an example of a conventional mobile communication system.

Switching between channels during communication is performed in accordance with the signal sequence illustrated in FIG. 5. It is assumed now that base stations 2a and 2b are located adjacent each other and mobile station 1 moves, during service, from the service area of the control base station 2a in control to the service area of the adjacent base station 2b. In this instance, when mobile station 1 approaches the border of the service area of base station 2a and the received electric field becomes weak, mobile station 1 transmits a channel switching request signal to the controlling base station 2a, to which mobile station 1 is then connected, adding as additional information the base station identification number CS(2b) of base station 2b to which the channel is to be switched (step A). Base station 2a designates the identification number PN(1) of mobile station 1 as an originating sub-address adding the base station identification number CS(2b), and originates a call designating the subscriber number N(4) allocated to MSCC 4 as the terminating address, sets a communication line from base station 2a to MSCC 4 and notifies the channel switching request from mobile station 1 to MSCC 4 (step B). MSCC 4 holds the communication line set between base station 2a and MSCC 4, originates a call designating the mobile station identification number PN(1) as an originating sub-address and the subscriber number N(2b) of base station 2b as the terminating address, sets a communication line from MSCC 4 to base station 2b and requests base station 2b to secure a new radio channel necessary for channel switching (step C). Base station 2b stores the identification number PN(1) of mobile station 1 and returns an alerting message to MSCC 4 to report information of the radio channel secured for channel switching to MSCC 4 (step D). MSCC 4 notifies the information of the radio channel secured for channel switching and the identification number CS(2b) of base station 2b to base station 2a using the alerting message (step E). Upon reception of the alerting message, base station 2a transmits a channel switching instruction signal to mobile station 1 to notify the information of the radio channel for channel switching to the adjacent base station 2b which is the destination of the switching (step F).

Upon reception of the channel switching instruction signal including the base station identification number CS(2b), mobile station 1 effects the channel switching process based on a re-originating procedure to base station 2b (step G). Upon reception of the originating request from mobile station 1, base station 2b confirms that the received mobile station identification number is identical with the mobile station identification number PN(1) stored at step D, and transmits a message of connection adding a channel switching completion signal to MSCC 4 (step H). Upon reception of the channel switching completion report, MSCC 4 disconnects the communication line established at the time of the channel switching request from base station 2a at step B (step I), and further disconnects the communication line to mobile station 1 which has been in a connected condition to base station 2a for service until channel switching Step J.

While the embodiment of the present invention is described in detail above with reference to the drawings, connection of a call originating from or terminating at a mobile station, registration of the location of the mobile station and channel switching process during service are performed by way of mobile subscriber connection control equipment (MSCC) using an ISDN subscriber interface, and a mobile communication network is constructed in an ISDN switched network without providing a switch for exclusive use for mobile communication.

The present invention can be applied also to systems wherein base stations are provided in a private branch or inside ordinary houses.

We claim:

1. A mobile communication system which makes use of an ISDN switched network, comprising:

mobile subscriber data register equipment for registering information regarding mobile subscribers including subscriber numbers of the mobile subscribers, subscriber data of the mobile subscribers, identification numbers of mobile stations, and location information of the mobile stations;

base stations connected to subscriber lines of ISDN local switches through ISDN subscriber interfaces, and performing radio link control of the mobile stations to connect calls which are originated from or terminated at the mobile stations to said ISDN switched network by way of the subscriber lines;

mobile subscriber connection control equipment connected to a subscriber line of an ISDN local switch through subscriber interface, and to said mobile subscriber data register equipment, said mobile subscriber connection control equipment controlling said mobile subscriber data register equipment; and wherein calls which are originated from or terminated at the mobile stations are first routed to said mobile subscriber connection control equipment over said subscriber line of said ISDN local switch, and thereafter said mobile subscriber connection control equipment completes the calls by re-originating said calls terminated at the mobile subscriber connection control equipment over said ISDN switched network through said ISDN local switch and designating a called subscriber as the terminating address.

2. A mobile communication system as claimed in claim 1 wherein, when an originating mobile station of said mobile stations sends a call request for a fixed subscriber to a base station designating a called subscriber number for said fixed subscriber and adding an assigned identification number of the originating mobile station, the base station regenerates a call designating a subscriber number allocated to said mobile subscriber connection control equipment as a called number and adding said called subscriber number and said assigned identification number as additional information, said mobile subscriber connection control equipment reads out and analyzes said subscriber data of said mobile stations corresponding to said assigned identification number from said mobile subscriber data register equipment, and re-originates a call to said fixed subscriber; and when said fixed subscriber sends a call request designating a receiving subscriber number of one of said mobile subscriber numbers as a called number, a call is first set up and terminated at said mobile subscriber connection control equipment, said mobile subscriber connection control equipment reads out and analyzes an assigned identification number and a location information of a corresponding mobile station in accordance with the receiving subscriber number from said mobile subscriber data register equipment, determines at least one base station to be seized, and re-originates a call designating a subscriber number allocated to said at least one base station and adding the assigned mobile station identification number as additional information, and said at least one base station alerts one of the mobile stations in accordance with the assigned identification number to terminate the call at the one of said mobile stations.

3. A mobile communication system as claimed in claim 1 wherein, when one of the mobile stations detects a changing of a location registration area and transmits a location registration request signal to one of the base stations which belongs to the location registration area after the changing adding a assigned identification number of the one of said mobile stations, said one of the base stations re-originates a call designating the subscriber number of said mobile subscriber connection control equipment as a called number and adding said assigned identification number and said location registration request signal as additional information, and said mobile subscriber connection control equipment refers to said identification number and the calling number of said one of the base stations to update the location information of said one of the mobile stations in said mobile subscriber data register equipment.

4. A mobile communication system as claimed in claim 1 wherein, when one of the mobile stations during service transmits a channel switching request signal to one of the base stations which is in control, designating an adjacent base station to which said one of the mobile stations desires to be connected, said one of the base stations which is in control originates a call to said mobile subscriber connection control equipment to report the channel switching request along with the identification number of said one of the mobile stations and said channel switching request signal as additional information; said mobile subscriber connection control equipment originates a call to said adjacent base station to report information regarding the channel switching request and instructs said adjacent base station to secure a radio channel for switching; said adjacent base station stores the identification number of said one of the mobile stations and reports a securing condition of the radio channel for switching to said mobile subscriber connection control equipment using an alerting signal; said mobile subscriber connection control equipment instructs, when it confirms that the radio channel for switching has been prepared, the channel switching to said one of the base stations which is in control using an alerting signal adding the information of the radio channel for switching; said one of the base stations which is in control instructs said one of the mobile stations to perform switching of the radio channel; said one of the mobile stations performs switching of the radio channel in accordance with the switching instruction; and said adjacent base station reports, after confirming the switching of the radio channel, to said mobile subscriber connection control equipment using a signal of connection that the switching of the radio channel has been completed.

\* \* \* \* \*

UNITED STATES PATENT AND TRADEMARK OFFICE
CERTIFICATE OF CORRECTION

PATENT NO. : 5,542,094
DATED : July 30, 1996
INVENTOR(S) : Junichi OWADA

It is certified that error appears in the above-indentified patent and that said Letters Patent is hereby corrected as shown below:

Column 3, line 37, after "number" insert --N(1)--.

Signed and Sealed this

Twenty-sixth Day of November 1996

Attest:

BRUCE LEHMAN

Attesting Officer     Commissioner of Patents and Trademarks